United States Patent [19]

Barnard et al.

[11] Patent Number: 4,599,912
[45] Date of Patent: Jul. 15, 1986

[54] ELECTRIC RESTART CONTROL

[75] Inventors: Michael A. Barnard; Arthur L. Urban; Bruce J. Kester; Anthony F. Beugelsdyk; Dale C. Kester, all of Wichita, Kans.

[73] Assignee: Conchemco, Incorporated, Lenexa, Kans.

[21] Appl. No.: 459,408

[22] Filed: Jan. 20, 1983

[51] Int. Cl.⁴ .................. F16C 1/10; A01D 69/04; A01D 69/10
[52] U.S. Cl. .................. 74/501 R; 56/11.3; 56/11.8; 74/483 R
[58] Field of Search .............. 74/501 R, 483 R; 56/10.5, 10.8, 11.3, 11.8, DIG. 6, DIG. 2; 180/19 H; 192/99 R, 99 S, 131 R

[56] References Cited

U.S. PATENT DOCUMENTS

| 4,335,566 | 6/1982 | Hurd | 56/11.3 |
| 4,362,228 | 12/1982 | Plamper et al. | 56/11.3 |
| 4,363,206 | 12/1982 | Schmitt | 56/11.3 |
| 4,413,466 | 11/1983 | Beugelsdyk et al. | 56/11.3 |
| 4,428,180 | 1/1984 | Carlson | 56/11.3 |
| 4,430,848 | 2/1984 | Wistrom | 56/11.3 |
| 4,432,191 | 2/1984 | Schmitt | 56/11.3 |

*Primary Examiner*—Gary L. Smith
*Assistant Examiner*—Vinh Luong

*Attorney, Agent, or Firm*—Schmidt, Johnson, Hovey & Williams

[57] ABSTRACT

A compact, safety, control assembly for lawnmowers having electrically started engines is provided which includes a "dead man" function and which requires two distinct steps for starting the lawnmower engine. The control assembly preferably includes a shiftable bail, a movable lever, a cable connected to the lawnmower ignition assembly and shiftable between positions corresponding to the off, on and start position of the ignition assembly, a rotatable operating mechanism connected to the cable and operable by the bail, a fitting attached to the cable and engageable by the lever, and a spring biasing the cable to the off position. A second embodiment of the invention is provided that does not include a lever or cable fitting and which is applicable to so-called zone restart lawnmower controls. In operation, the operating mechanism is rotated by the operation of the bail thereby shifting the cable into the on position. Rotation of the operating mechanism clears the movable lever for shifting thereof, and the fitting attached to the cable is engaged by the lever for shifting the cable from the on to the start position. The biasing spring returns the cable to the on position when the lever is released, and the cable is retained in the on position so long as the bail is held in its grasped position. Upon release of the bail, the operating mechanism rotates to its original position, the cable shifts to the off position, and the lawnmower engine is shut down.

7 Claims, 10 Drawing Figures

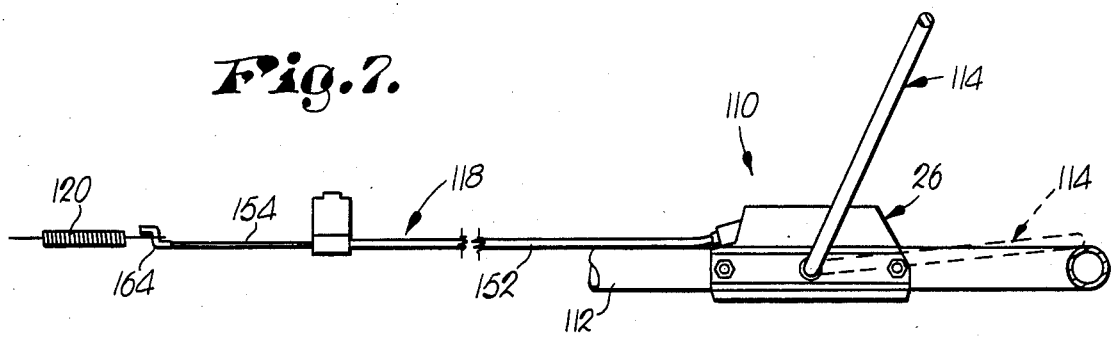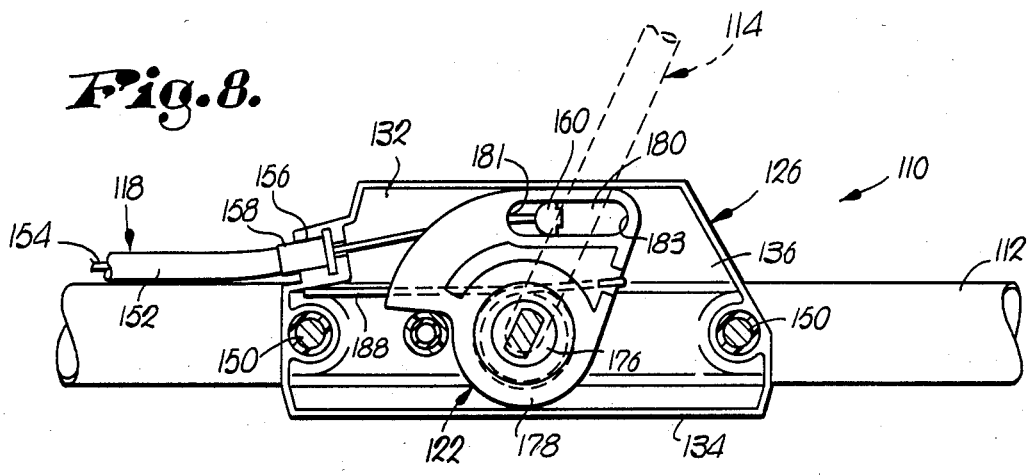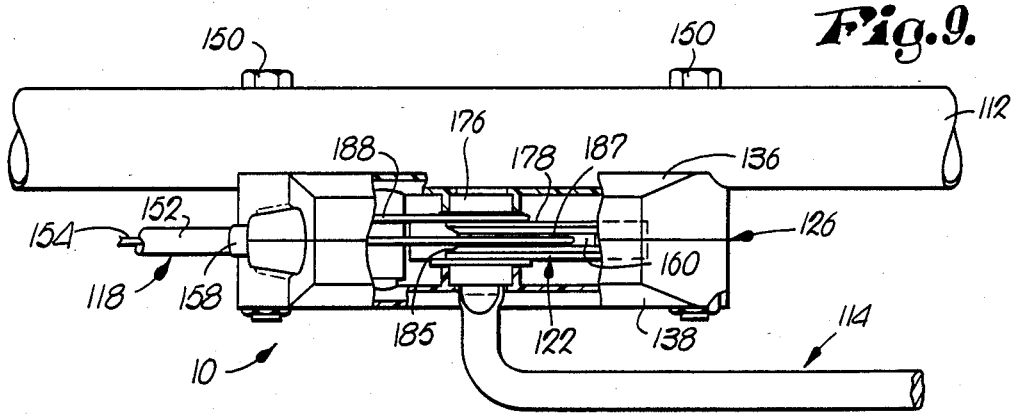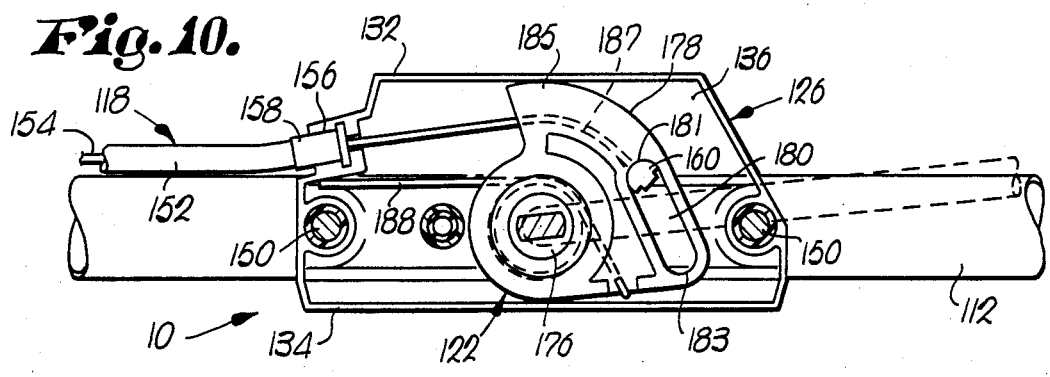

ELECTRIC RESTART CONTROL

BACKGROUND OF THE INVENTION

1. Field of the Invention

The present invention is concerned with an improved control assembly for lawnmowers having electrically started engines. More particularly, it is concerned with such a control apparatus which provides a desirable "dead man" function, along with a two step procedure for starting the engine. A second embodiment of the invention is provided that is applicable to so-called zone restart lawnmower controls.

2. Description of the Prior Art

Powered lawnmowers having electrically started engines are well known and in wide spread use. Generally speaking, such mowers are often of the walk-behind rotary type and include a lowermost housing supported on spaced wheels, and a gasoline powered engine coupled to a rotary mower blade disposed within the housing. An elongated handle is affixed to the housing at the rear thereof, so that the user operates the mower while walking behind the engine and supporting housing.

In recent years the government has promulgated a number of safety regulations relating to mowers of the type described. For example, such mowers must now be equipped with a so called "dead man" switch which generally includes a spring-biased handle which is grasped by the operator during normal operation of the mower. The mowing action is rapidly terminated when the handle is released, making it impossible to leave the mower running while unattended.

In addition, it has been proposed that electrically started power mowers be provided with a control assembly requiring two distinct actions for starting the mower once it has ceased operation.

A control apparatus designed for accomplishing the above-described functions is disclosed in copending application Ser. No. 388,898, now U.S. Pat. No. 4,466,308, assigned to the assignee of the present application. Although the apparatus in application Ser. No. 388,898 discloses a low cost, compact, reliable and easy to use control apparatus which includes a "dead man" function and which requires two distinct steps for starting the lawnmower engine, the apparatus disclosed in the 388,898 application requires a two-piece operating mechanism that adds to the cost of the control apparatus, and compounds the number of surfaces within the control exposed to wear.

Another government safety regulation dealing with power lawnmowers is concerned with so-called "zone restart" lawnmower controls. A power lawnmower with a zone restart control includes a conventional pull cord for initially rotating the mower motor to effect ignition of the motor. The handle of the pull cord, however, must be located in a zone spaced apart from the rotating blade of the mower. A cable actuated control mechanism that frees the motor flywheel and completes the ignition electrical circuit is actuated by a control lever located within close proximity to the handle of the pull cord. The operator must be within the designated zone spaced apart from the motor blade to both grasp the lever to free the flywheel and to complete the ignition circuitry, and to pull the pull cord.

A control apparatus which includes a "dead man" function and which requires two distinct steps for restarting the lawnmower engine, and which includes a minimum number of operating parts with attendant wear surfaces and which can be adapted to zone restart lawnmower controls would provide an advantage in the control apparatus art.

SUMMARY OF THE INVENTION

The present invention relates to a remote control starting assembly for power lawnmowers which satisfies all presently existing and proposed safety standards, and which includes a minimum of moving parts and wear surfaces. Broadly speaking, the assembly hereof includes a shiftable handle, a movable lever, a cable connected to the lawnmower ignition assembly and shiftable between positions corresponding to the off, on and start position of the engine ignition assembly, and a spring biasing the cable to the off position. The cable is connected to a one piece rotatable operating mechanism that is engageable by the shiftable handle for rotation of the mechanism and consequent shifting of the cable to the on position from the off position. A T-shaped fitting is attached to the cable which is engageable by the pivotal lever for consequent shifting of the cable to the start position from the on position.

In particularly preferred forms, the shiftable handle includes an attachment or bail for grasping by the operator, and the operating mechanism includes a shoulder stop for limiting the travel of the cable beyond the start position thereof.

A second embodiment of the invention applicable to "zone restart" lawnmower controls is provided that includes a shiftable handle, a cable, a one-piece operating mechanism, and a biasing spring.

BRIEF DESCRIPTION OF THE DRAWINGS

FIG. 7 is a fragmentary, perspective view depicting an alternative embodiment of the control apparatus in accordance with the present invention operably mounted on the main handle of a power lawnmower;

FIG. 8 is a vertical, sectional view of the control the handle means depicted by phantom lines in the released position;

FIG. 9 is a fragmentary, top view of the second embodiment of the control apparatus; and FIG. 10 is a vertical, sectional view of the second embodiment of the control apparatus, the handle means depicted by phantom lines in the grasped position.

DESCRIPTION OF THE PREFERRED EMBODIMENT

Figure 1:
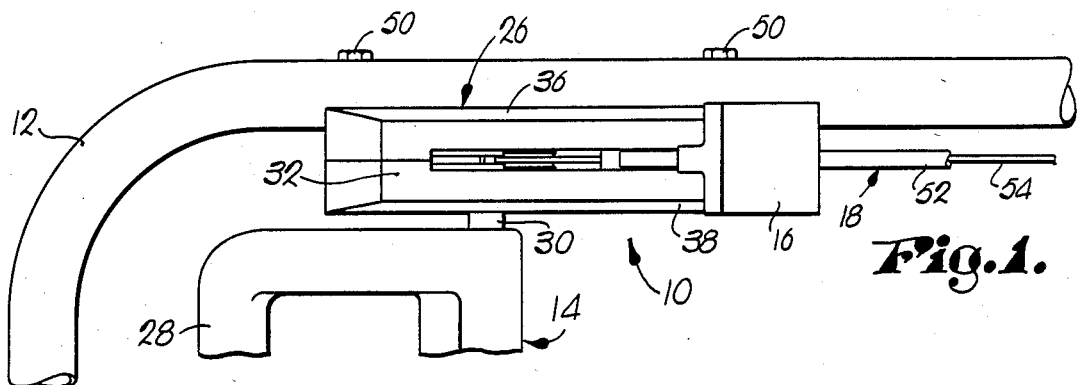
FIG. 1 is a fragmentary, perspective view depicting the control apparatus of the present invention operably mounted on the main handle of a powered lawnmower.

Turning to the drawings, a control assembly 10 is depicted in FIG. 1 as it would appear when operably mounted on the U-shaped main handle 12 of a power lawnmower. The assembly 10 broadly includes shiftable handle 14, movable operating means or lever 16, cable 18, cable biasing spring 20, operating mechanism 22, T-shaped cable fitting 62, and housing 26.

In more detail, the handle 14 includes a synthetic resin, hand graspable bail 28 and a metallic connecting rod 30 received within housing 26. Housing 26 includes a top wall 32, a bottom wall 34, and a pair of sidewalls 36, 38. Guide forming ribs 40 project inwardly from each sidewall 36, 38 to define a fitting-receiving channel 42. A reinforcing rib 44 projects inwardly from each sidewall 36, 38, as do a plurality of inwardly projecting, complementary lugs 46 for mating engagement of the sidewalls 36, 38. Sidewall 36 includes a spring-retaining lug 48. The housing 26 is coupled to handle 12 by means of appropriate bolts or other fasteners 50.

The cable 18 includes an outer casing 52 and an inner metallic element 54. The cable 18 is received within the housing 26 at aperture 56, and is retained therein by a sleeve 58 attached to the end of cable outer casing 52. Metallic element 54 terminates within the housing 26 with cable end portion 60. A T-shaped, lever-engaging fitting 62 is fixedly attached to metallic element 54 within housing 26. The end of metallic element 54 opposite the end received within housing 26 includes an S-shaped coupling 64. Coupling 64 is received through an aperture in connecting arm 66. Cable biasing spring 20 is connected to the arm 66.

The movable operating means 16 comprises a lever arm pivotally mounted around the lowermost lug 46. The lever 16 includes an elongated, centered aperture 68 through which the T-shaped cable fitting 62 and metallic element 54 are received, and an operating mechanism engaging stop surface 70. A spring 72 stretches between housing lug 48 and a lug 74 attached to lever 16.

Operating mechanism 22 includes a sleeve 76 through which arm 30 of handle 14 is received in fixed relationship for rotation therewith. Operating mechanism 22 includes an irregularly shaped body 78 connected to sleeve 76. Body 78 includes a cable end portion-receiving slot 80 having forward and rearward end walls 81, 83 respectively, a cable travel-limiting shoulder 82, a lever-engaging protrusion 84, a cable receiving channel 85 having a lowermost, arcuate, cable supporting surface 87, and a lug-engaging surface 86. The operating mechanism 22 is biased in a clockwise rotation, as depicted in the drawings, by spring 88. Spring 88 is engaged by a lug 46, and by a spring retaining ridge 90 on body 98 of operating mechanism 22.

Referring to FIGS. 7-10, an alternative embodiment of the present invention adaptable for use with zone restart lawnmower controls will be described. A control assembly 110 is depicted in FIG. 7 as it would appear when operably mounted on the U-shaped main handle 112 of a power lawnmower. The assembly 110 broadly includes a shiftable handle 114, cable 118, cable biasing spring 120, operating mechanism 122, and housing 126.

In more detail, housing 126 includes a top wall 132, bottom wall 134, and a pair of sidewalls 136, 138. The housing 26 is coupled to handle 112 by means of appropriate bolts or other fasteners 150.

The cable 118 includes an outer casing 152 and an inner metallic element 154. The cable 118 is received within the housing 126 at aperture 156, and is retained therein by sleeve 158 attached to the end of cable outer casing 152. The aperture 156 has a cable-directing axis transverse the axis of the handle 112. Metallic element 154 terminates within the housing 126 with cable end portion 160. The end of metallic element 154 opposite the end received within housing 126 includes an S-shaped coupling 164. Operating mechanism 122 is similar in construction to the operating mechanism 22 described hereinabove in conjunction with the first embodiment of the present invention and includes a sleeve 176 through which handle 114 is received in fixed relationship for rotation therewith. Operating mechanism 122 includes an irregularly shaped body 178 connected to sleeve 176. Body 178 includes a cable end portion-receiving slot 180 having forward and rearward end walls 181, 183, and cable-receiving channel 185 having a lowermost, arcuate, cable-supporting surface 187. The operating mechanism 182 is biased in a clockwise rotation, as depicted in FIGS. 8 and 10, by spring 188.

The operation of control apparatus 10 will now be described, and particularly with reference to FIGS. 2-4, which illustrate an operation sequence.

Figure 2:
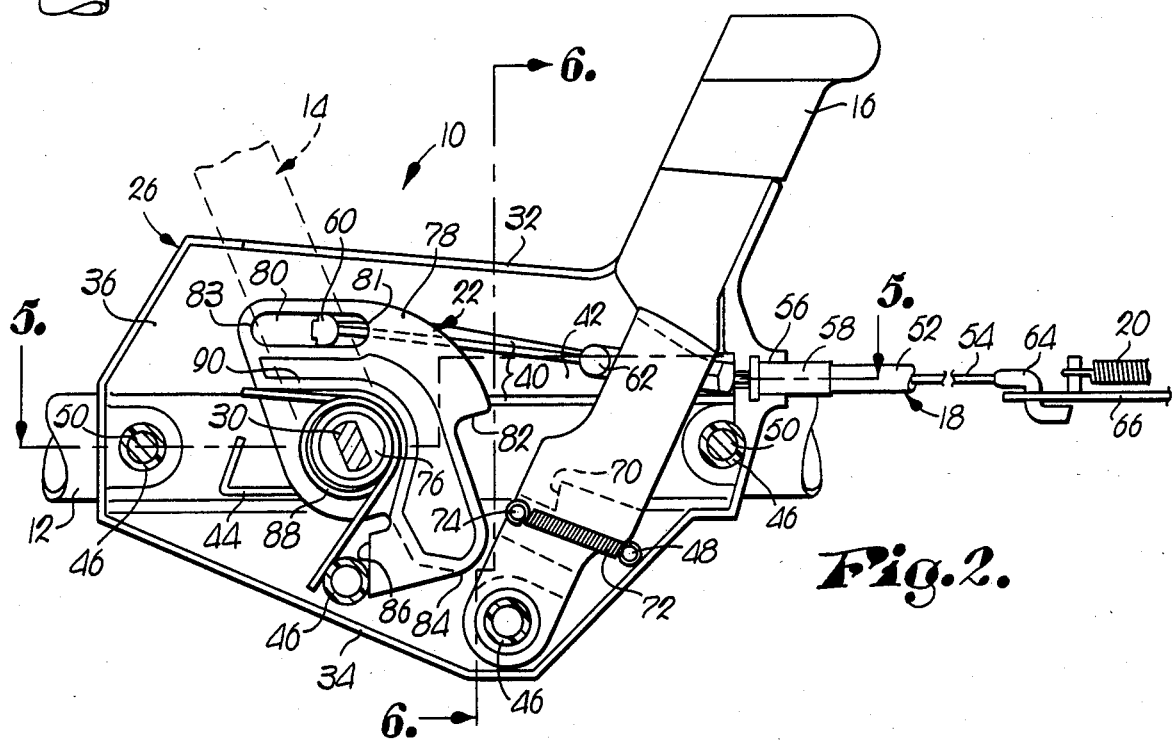
FIG. 2 is a vertical, sectional view of the control apparatus, with the cable and operating mechanism in the off position, the handle depicted by phantom lines.

Referring first to FIG. 2, the handle means 14 are depicted in a released position, and the lever 16 is biased rightwardly by spring 72. Spring 88 biases operating mechanism 22 clockwise such that lug-engaging surface 86 is flush with cooperating lug 46, and protrusion 84 is aligned with stop surface 70 of lever 16. Lever 16 is thereby detained from being shifted leftwardly.

Figure 3:
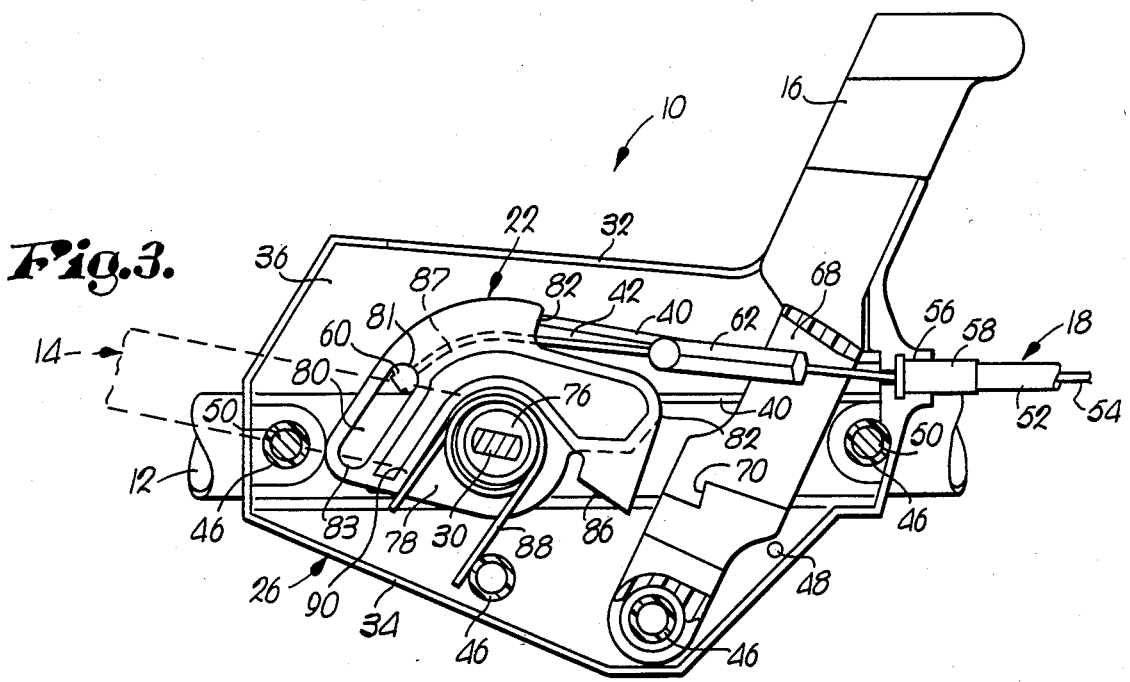
FIG. 3 is similar to FIG. 2 but with the cable and operating mechanism in the on position.

The first step in starting the lawmower comprises manually shifting the handle means 14 from the released position depicted in FIG. 2 to the grasped position depicted in FIG. 3. Operating mechanism 22 is rotated in a counterclockwise direction by handle 14 due to the fixed engagement of connecting arm 30 of handle 14 with sleeve 76 of operating mechanism 22. The cable end portion 60 is thus engaged by the forward endwall 81 of slot 80 and the metallic element 54 of cable 18 is thereby shifted leftwardly from the off position depicted in FIG. 2 to the on position depicted in FIG. 3.

Figure 4:
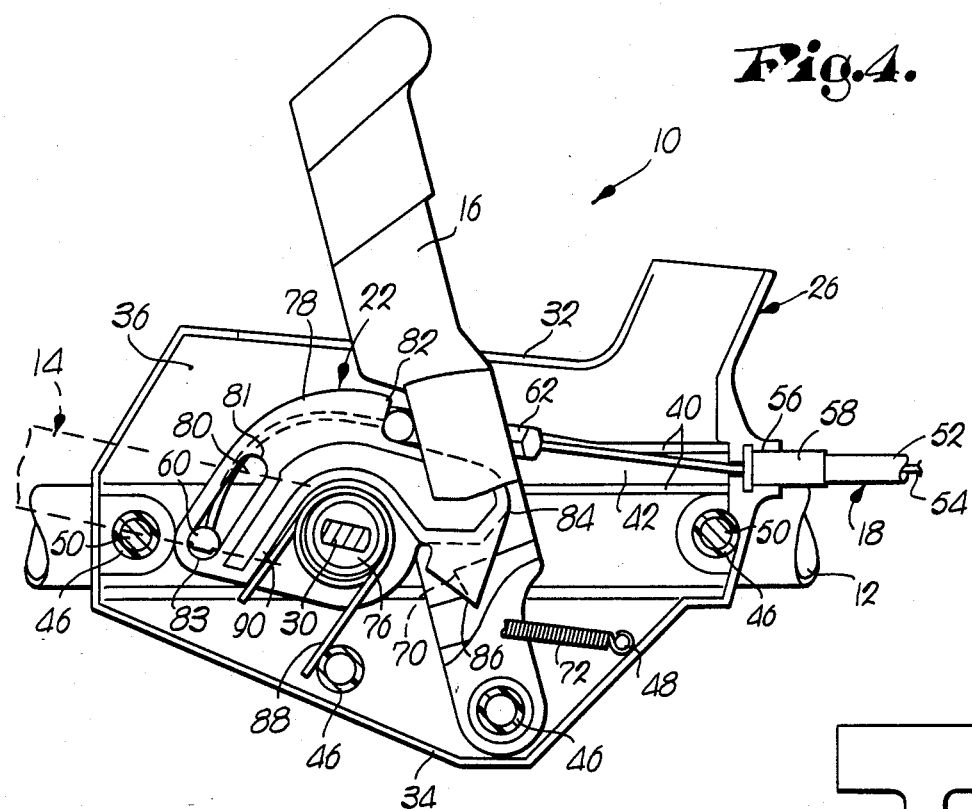
FIG. 4 is similar to FIG. 2 but with the cable in the start position.
Figure 6:
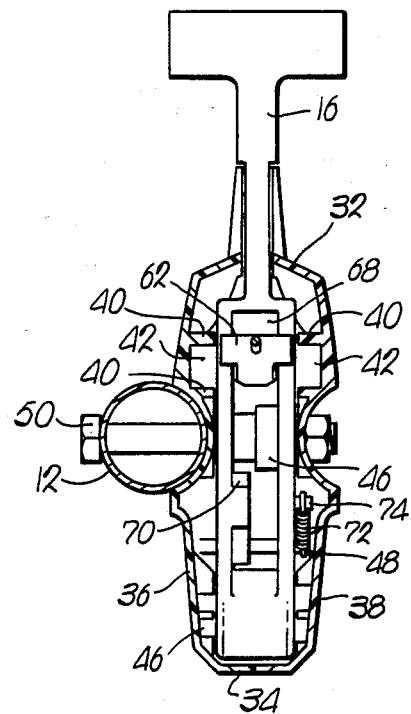
FIG. 6 is a sectional line taken along line 6—6 of FIG. 2.
Figure 5:
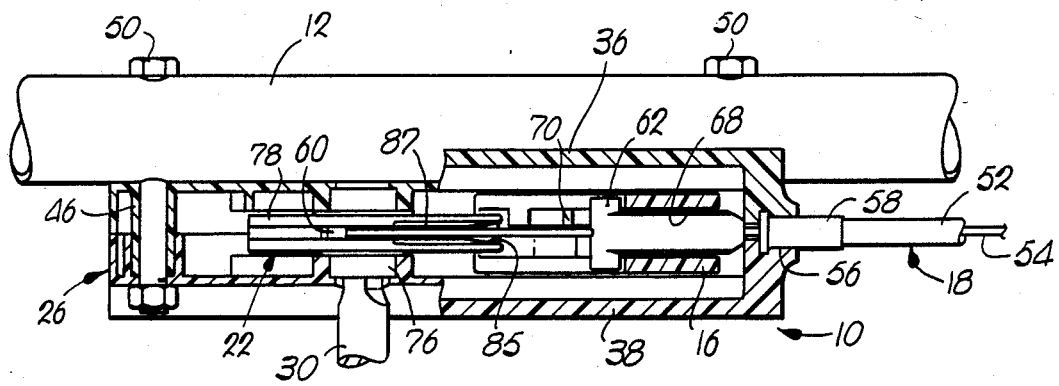
FIG. 5 is a sectional view taken along line 5—5 of FIG. 2.

Motor ignition is accomplished by shifting the cable from the on position as depicted in FIG. 3 to the start position as depicted in FIG. 4. Lever 16 is shifted leftwardly, engaging the cross piece of T-fitting 62 attached to metallic element 54 of cable 18. It will be noted that when the handle 14 is shifted to the grasped position, protrusion 84 of operating mechanism 22 is shifted to a position clearing the stop surface 70 of lever 16. Lever 16 may be shifted leftwardly until the cross piece of T-fitting 62 engages the limiting shoulder 82 of operating mechanism 22. The lever 16 is maintained in the position depicted in FIG. 4 until ignition of the motor is accomplished. Upon ignition, the operator releases lever 16, and lever 16 is returned to its original position by spring 72. Metallic element 54 of cable 18 will thereby shift to the on position and the lawnmower may be operated.

The handle 14 will shift from the grasped position to the released position under the influence of biasing spring 82 when the operator releases the bail 28 of handle 14. Metallic element 54 of cable 18 will thereupon be shifted to the off position under the influence of biasing spring 20, and the lawnmower will cease operating. Reignition of the lawnmower will occur only upon repetition of the above-described steps in the appropriate sequence.

Referring to FIG. 2, it will be noted that the cable end portion 60 is spaced apart from the forward end wall 81 of slot 80 when handle 14 is in the released position. The gap presented between the cable end portion 60 and the end wall 81 of the slot 80 permits self-adjustment of the control apparatus 10 to variations in the off position of cable 18. That is to say, in some applications the cable 18 may be connected to a band brake as well as to the ignition assembly. The band brake (not shown) is in frictional alignment with the fly wheel of the lawnmower motor such that the blade rotor rotation will be stopped by the brake whenever the cable 18 is shifted to the off position. As will be appreciated, as the band brake frictional surface wears, the position of metallic element 54 correlating to the off position of the ignition assembly will shift. The gap presented between cable end portion 60 and the end wall 81 of slot 80 provides enough free play within apparatus 10 to adjust for the shifting orientation of the metallic element 54 of cable 18.

The operation of the alternative embodiment of control apparatus 110 will now be described.

Referring to FIG. 8, the handle means 114 are depicted in a released position, and the metallic element 154 of cable 118 is depicted in the rest position. Spring 188 biases handle means 114 to the released position, and the upper edge of mechanism 122 abuts against the lower surface of top wall 132, thereby detaining handle means 114 from shifting beyond the released position.

Metallic element 154 of cable 118 is shifted from the rest position to its shifted position by manually shifting the handle means 114 from the released position depicted in FIG. 8 to the grasped position depicted in FIG. 10. Operating mechanism 122 is rotated in a clockwise direction, as depicted in FIG. 8 and FIG. 10, by handle 114, due to the fixed engagement of the handle 114 with sleeve 76 of the operating mechanism 122. The cable end portion 160 is thus engaged by the forward end wall 181 of slot 180 and the metallic element 154 of cable 118 is thereby shifted to a rest position to the shifted position.

The handle 114 will shift from the grasped position to the released position under the influence of biasing spring 182 when the operator releases the handle 114. Metallic element 154 of cable 118 will thereupon be shifted to the rest position under the influence of biasing spring 120.

Referring to FIG. 8, it will be noted that the cable end fitting 116 is spaced apart from the forward end wall 181 of slot 180 in the same manner as described above in conjunction with the first embodiment of the invention. The gap presented between the cable end portion 160 and the end wall 181 permits self-adjustment of the control apparatus 110 to variations in the rest position of cable 118 in the same manner as hereinabove described in conjunction with the first embodiment.

We claim:

1. A power lawnmower control apparatus for engaging an electric ignition assembly having off, on and start positions, comprising:

handle means shiftable between a grasped position and a released position;

operating means comprising an elongated lever pivotally movable about one end thereof and including structure defining an aperture therethrough;

cable means received through said aperture and adapted for operative connection to said ignition assembly and shiftable between positions corresponding to said off, and on and start position of said ignition assembly;

means for biasing said cable means to said off position;

operating mechanism operably coupled to said cable means and said handle means for shifting of said cable means to said on position in response to shifting of said handle means from said released position to said grasped position, said cable means including an end fitting, said operating mechanism including structure defining a slot therein, said cable end fitting being received within said slot in reciprocating relationship thereto; and engageable means operably coupled to said cable means, and spaced apart from said operating mechanism when said cable means are out of said start position, for engagement by said operating means and subsequent shifting of said cable means from said on position to said start position when said cable means are in said on position and said engageable means are movably engaged by said operating means.

2. A control apparatus as claimed in claim 1, including second biasing means operably coupled to said operating mechanism for biasing said handle means to said released position.

3. A control apparatus as claimed in claim 2, said operating means including means for stopping engagement with said engageable means when said cable is shifted to said start position for limiting the travel of said cable means beyond said start position thereof.

4. A control apparatus as claimed in claim 1, said operating mechanism including detaining means for engagement with said operating means when said handle means are in said released position and for clearing said operating means when said handle means are in said grasped position.

5. An apparatus as set forth in claim 1, said handle means including structure oriented for grasping by the operator of said apparatus to maintain said handle means in said grasped position.

6. An apparatus as set forth in claim 1, said engageable means comprising a T-shaped fitting attached to said cable means.

7. An apparatus as set forth in claim 1, said slot having opposed end walls, said fitting engageable in contacting relationship with one of said end walls for shifting of said cable means to said on position in response to shifting of said handle means from said released position to said grasped position, said end fitting being normally spaced apart from said one end wall and thereby defining a gap between said fitting and said end wall when said handle means are in said released position, said gap providing for self-adjustment of said apparatus to variations in the off position of said cable means.

* * * * *